United States Patent
Knotts et al.

(10) Patent No.: US 10,514,962 B2
(45) Date of Patent: Dec. 24, 2019

(54) WEB COMM CHANNEL SYSTEM AND METHOD

(71) Applicant: Box, Inc., Redwood City, CA (US)

(72) Inventors: Ryan Matthew Knotts, San Jose, CA (US); Jeremy Spiegel, San Francisco, CA (US); Christopher Vasselli, Brattleboro, VT (US)

(73) Assignee: Box, Inc., Redwood City, CA (US)

( * ) Notice: Subject to any disclaimer, the term of this patent is extended or adjusted under 35 U.S.C. 154(b) by 414 days.

(21) Appl. No.: 14/929,980

(22) Filed: Nov. 2, 2015

(65) Prior Publication Data

US 2017/0123864 A1 May 4, 2017

(51) Int. Cl.
*G06F 9/54* (2006.01)
*H04L 29/08* (2006.01)
*H04L 29/06* (2006.01)

(52) U.S. Cl.
CPC ............... *G06F 9/54* (2013.01); *H04L 67/02* (2013.01); *H04L 67/146* (2013.01); *H04L 69/28* (2013.01); *H04L 63/0823* (2013.01)

(58) Field of Classification Search
CPC ............. G06F 9/54; G06F 9/547; H04L 67/02
See application file for complete search history.

(56) References Cited

U.S. PATENT DOCUMENTS

| | | | | |
|---|---|---|---|---|
| 7,461,144 B1 * | 12/2008 | Beloussov | ............ | G06F 9/5055 707/999.202 |
| 9,497,197 B2 | 11/2016 | Kus | | |
| 9,813,421 B2 | 11/2017 | Kus | | |
| 10,243,953 B2 | 3/2019 | Kus | | |
| 2008/0295114 A1 * | 11/2008 | Argade | ................... | G06F 9/485 719/320 |
| 2012/0084381 A1 * | 4/2012 | Alladi | ..................... | G06F 9/544 709/213 |
| 2013/0339485 A1 * | 12/2013 | Sen | ...................... | G06F 9/44521 709/219 |
| 2014/0195934 A1 * | 7/2014 | Harrison | ............... | H04L 12/189 715/758 |
| 2014/0280995 A1 * | 9/2014 | Ezell | .................. | H04L 65/1016 709/229 |
| 2015/0112927 A1 | 4/2015 | Lee | | |
| 2015/0358328 A1 * | 12/2015 | Kaplan | ............... | H04L 67/1095 726/6 |
| 2017/0123864 A1 | 5/2017 | Knotts | | |
| 2017/0177610 A1 | 6/2017 | Knotts | | |

* cited by examiner

*Primary Examiner* — Umut Onat
(74) *Attorney, Agent, or Firm* — Vista IP Law Group, LLP

(57) ABSTRACT

Disclosed is a method and mechanism to implement a communication channel between a web application and a locally running application on a computing system. A local communications server is employed to pass messages between the web application and a local application using a local comm server. The local comm server communicates with the local application over a named pipe that is dedicated to a specific web session and/or application.

30 Claims, 13 Drawing Sheets

WEB COMM CHANNEL SYSTEM AND METHOD

BACKGROUND

Many systems currently use a plugin, such as a NPAPI (NETSCAPE Plugin Application Programming Interface) plugin, to implement communications between a web browser and a locally running application. The plugin has the primary purpose of passing messages from the web browser to the local application, and to also return responses from the local application to the web browser.

While this type of communications approach currently functions adequately, many browsers are discontinuing NPAPI support. In other words, many modern browsers are now starting to disable the NPAPI plugins, turning off the plugins by default, warning users when they are run, and/or disabling them altogether is some circumstances.

The lack of support for these types of plugins is leading to a problem for systems that require a communications path between web applications and locally running applications. For example, many legacy systems and applications are configured to operate based on the ability to implement some sort of communications between the web browser and a local application. Without such a communication path, these legacy applications will no longer be able to function properly.

The problem to be solved is therefore rooted in technological limitations of the legacy approaches that require such communications paths. Improved techniques, in particular improved application of technology, are needed to address the problem of being able to provide communications between web applications and local application on a computing system.

SUMMARY

Some embodiments of the invention provide a method and mechanism to implement a communication channel between a web application and a locally running application on a computing system. A local communications server (hereinafter "comm server") is employed to pass messages between the web application and a local application. The web application communicates with the comm server using a protocol such as CORS (Cross Origin Resource Sharing). The comm server communicates with the local application over a named pipe that is dedicated to a specific web session and/or application.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Overview

Figure 1:
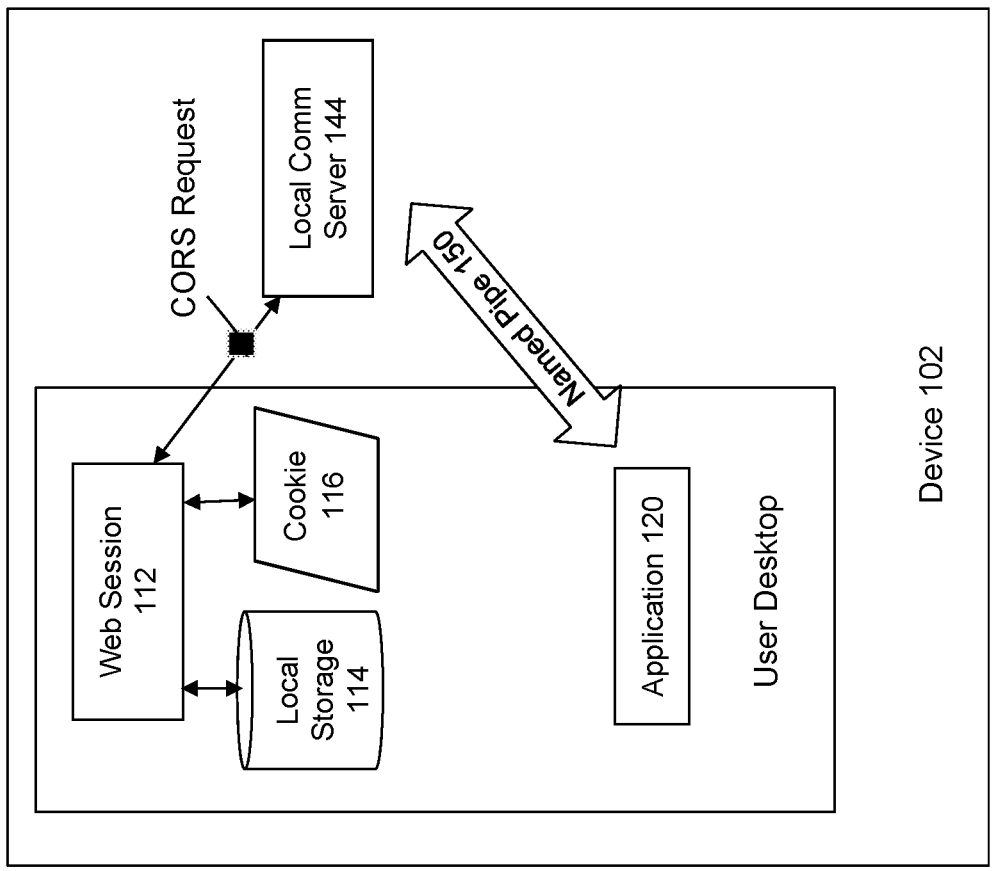
FIG. 1 illustrates an approach to implement a communications channel between a local application and a web application.

As previously discussed, many systems currently use a NPAPI plugin to implement communications between a web browser and a locally running application. Given the impending phase-out of such plugins in the near future, there is a need for an alternate communications path between the web session and the local application.

Some embodiments of the invention provide a method and mechanism to implement a communication channel between a web application and a locally running application on a computing system. A local comm server is employed to pass messages between the web application and a local application. The web application communicates with the comm server using a protocol such as CORS. The comm server communicates with the local application over a named pipe that is dedicated to a specific web session and/or application.

It is noted that the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Illustrative Embodiment

FIG. 1 illustrates an approach for implementing a communications channel between a web session application 112 and a local application 120 according to some embodiments of the invention.

In order to communicate in two directions with the native application running on the OS, the present embodiment utilizes cross-origin access mechanisms, such as the Cross-Origin Resource Sharing (CORS) mechanism provided by modern browsers. This type of mechanism allows resources on a web page to request access to/from another domain outside of the web page. In effect, the CORS mechanism permits restricted access for a web page to load information from another domain given proper authorization.

The local device 102 will include a https server (e.g., local comm server 144), that listens on a loopback interface. Using CORS headers, this https server can also specify that it only responds to AJAX (Asynchronous JAVASCRIPT and XML) requests originating from the web application 112. By establishing a long poll request to the local native application 120, the web application 112 can receive events from the native application 120 as well, providing viable two-way communication between the native app and the web app.

In some embodiments, the local comm server is run as a separate process from the local application. This will allow any legacy local applications to remain unchanged, where they can nonetheless still utilize inter-process communication mechanisms to communicate with the local comm server (rather than using a plugin).

The local comm server will bind to the loopback interface, so that it is only reachable by processes on the local device 102. The local comm server will attempt to bind to a known range of ports, and will listen on the first port found to be available. When the web application attempts to contact the local comm server with a CORS request, it will try the different ports in the known range sequentially until it gets the expected HTTPS connection.

The local comm server will only accept CORS requests on the loopback interface. That is, the HTTP requests it receives must contain the 'Origin:' header, and the value of that header will be verified against a whitelist. The Origin header is controlled by the browser, which inserts the name of the originating server for the web page. Browsers generally do not allow this header to be set directly by JAVASCRIPT code. When the local comm server receives a request, it will validate the Origin header, as well as the request itself. If the request and Origin header are valid, the local webserver will respond with a 200 OK, include the 'Access-Control-Allow-Origin:' header with the value of the passed in Origin header, and include the response to the request as JSON in the body of the response.

Communication between the local web server component and the local application native client can remain the same as the current communication between the native client and the web plugin, using any suitable type of local IPC (inter-process communications) channel. For example, using distributed notifications and/or XPC connections on OS X, and using a "named pipe" on Windows. A named pipe is an IPC mechanism that implemented as a system-persistent pipeline for communications between multiple points, where a set of communicating processes can access the named pipe using its designated name, e.g., where a first process accesses the named pipe as a writer and the other process accesses the named pipe as a reader. Other types of IPC channels may also be used, such as file system IPCs and sockets.

In some embodiments, a specially designated named pipe 150 is implemented for communications between a given web application 112 and a given local application 120. As discussed in more detail below, this approach solves the "multi-user" problem when using a shared local comm server.

In operation, the web application 112 will be assigned an ID value that is used to create the named pipe. The ID value in some embodiments may be assigned with guaranteed uniqueness. In alternate embodiments, the ID value is a randomly generated value having enough granularity (e.g., using a 32 or 64 bit number) to effectively minimize any chance of a collision between users. The ID value can be stored in a cookie 116 and/or in local storage device 114. One reason for storing the ID value in local storage instead of a cookie is because some applications may always pass cookie values to a remote server in usage, and this may be relatively inefficient if there is no particular need to send the ID value across the network to the server.

Figure 2:
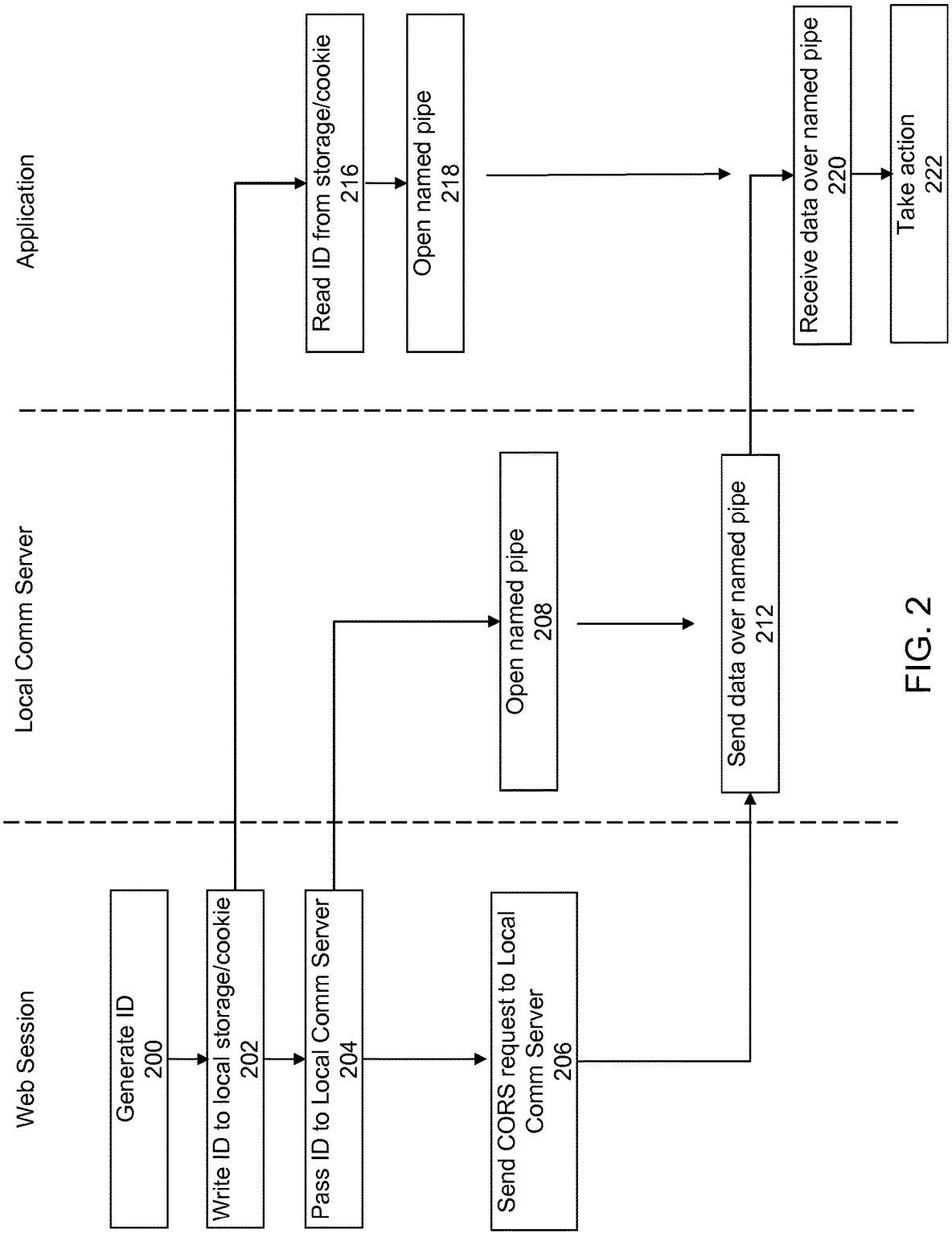
FIG. 2 shows a flowchart of an approach to implement a communications channel to communicate between a local application and a web application.

FIG. 2 illustrates a process for establishing communications according to some embodiments of the invention.

At 200, the web application generates a unique ID string. The web app generates a unique ID string, which consists of enough random bits to minimize the chance of a collision on the machine being used. The ID only needs to be unique in the system installed (for the users on a particular machine). Note that the number of users on a given system tends to top out in the hundreds, so using a 32-bit number (expressed as eight hexadecimal digits) is generally sufficient for a system. In some embodiments, this ID string is generated in JAVASCRIPT on the web page. Alternate embodiments may employ other approaches as well to generate the ID value, e.g., where the unique ID can be requested from a remote server, perhaps a hash of the logged in user with the IP address of the machine, to generate a unique ID across all user/devices.

At 202, the web app will then write the ID string to storage, either in a cookie or in a local storage device. In the cookie approach, two cookies may be written with this generated unique ID, where the first is a known named cookie with the unique ID saved as the value for that cookie and the second is a cookie with the unique ID in the name of the cookie, and no value stored in the cookie. The two cookies are written for different purposes: the web app can access the unique ID from the value of the definitively named cookie, but does not necessarily need to have a good mechanism for searching named cookies for a particular pattern. The local application may be configured such that it cannot read cookie values, but can however scan for cookies with names that match a particular pattern.

The cookies can be written with expiration dates set for in the future (e.g., one year), and the expiration date is updated each time the cookie is accessed by the web app. In this way, the cookies are essentially perpetual, and the unique ID for the browser session only needs to be regenerated if the user does not need the access for more than one year.

At 216, the local application will scan the local storage/cookies, searching for a cookie/storage item with the correct ID string. In some embodiments, the local application will check periodically (e.g., every 30 seconds) for cookies written in each supported browser to the appropriate container (or other supported domains). The local application looks for cookies with the appropriate name pattern, and will then extracts the character string to ascertain the unique ID for that browser session. In some embodiments, there may be a different ID for each browser—if the user uses three different browsers, then the local application may find three different unique IDs.

At 218, the local application opens a named pipe using the ID string farmed from the cookies. For each unique ID found by the local application, it opens a named pipe and listens on that pipe. Each instance of the local application may have several pipes open at the same time, where each one corresponds to a different browser session, e.g., one for each kind of browser (such as CHROME, FIREFOX, INTERNET EXPLORER). In some embodiments, a single browser may have multiple cookies, and consequently multiple IDs.

At 204, the web application passes the unique ID to the local comm server. The web app can test for the local comm server by querying the range of known ports until it gets an expected response.

When the web app makes any request/command to local application, it includes the unique ID as a parameter intended to be consumed by the Local Com Server. To that end, the parameter is included as an HTTP query parameter in the URL. This could be improved to be included as a HTTP header in the request rather than in the URL in order to obscure the unique ID from casual observation. The ID string may be passed as part of a CORS request at 206, which is sent the local comm server.

At 208, the local comm server opens the named pipe. When the Local Com Server needs to pass information to an instance of the local application, it opens the named pipe based on the application name and unique ID string received from the web app. Since the local application should have a pipe open based on scanning the cookies written by the web app, the named pipe will connect, and at 212, information passes from the Local Com Server to the local application instance identified by the unique ID.

At 220, the request data is received at the local application. Thereafter, at 222, the local application can take the appropriate action to implement the request.

Multi-User Communications

As noted above, a local comm server is used to communicate with the web application, where the web app communicates with the local com server via CORS, and the local comm server communicates with the local application through named pipes.

The issue is that on multi-user systems, it may be difficult to correlate a particular web app session with a particular user login. There is not necessarily a correlation between the userid for the user (which the web app has access to) and the username used to log into a desktop session (which the local application has access to). If the local comm server is shared between all of the web sessions on a device, then this becomes a potential problem being able to effectively direct communications from the local comm server to the appropriate local application. This is a situation that occurs, for example, in the VDI (virtual desktop infrastructure) systems, where a potentially large number of users all share the same device (and therefore the same local comm server) despite the fact that each user may have its own virtual desktop on the device.

Figure 3:
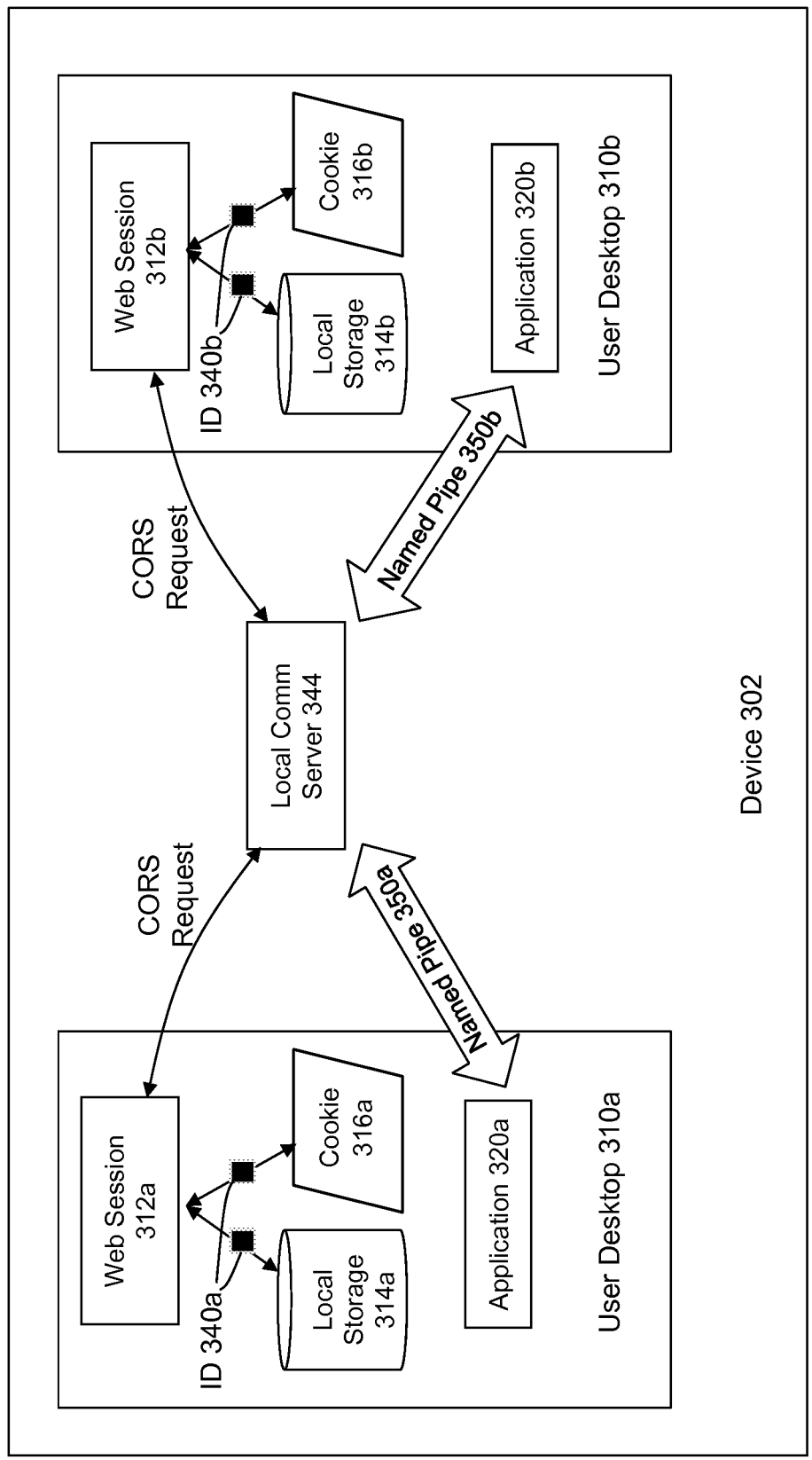
FIG. 3 illustrates a multi-user scenario for the communications channel.

As illustrated in FIG. 3, this problem is easily handled in embodiments of the present invention due to the usage of named pipes that are specific for each web session/local application. Here, the device 302 includes two virtual user desktops 310a and 310b. Each user desktop 310a and 310b has a web session 312a and 312b with its unique ID string 340a and 340b, respectively. In this situation, each of the web sessions will use its ID string to open its own named pipe to have the common local comm server 344 communicate with its local application.

For user desktop 310a, ID string 340a is used to open named pipe 350a. Therefore, any CORS requests from web session 312a to the local comm server 344 will be passed onto the local application 320a though named pipe 350a. For user desktop 310a, the ID string can be stored in a cookie 316a and/or in local storage 314a. For user desktop 310b, ID string 340b is used to open named pipe 350b, and any CORS requests from web session 312b to the local comm server 344 will be passed onto the local application 320b though the named pipe 350b. For user desktop 310b, the ID string can be stored in a cookie 316b and/or in local storage 314b.

This approach therefore allows any other desktop app which communicates with the web app through the local com server to continue to function on multi-user systems.

Figure 4:
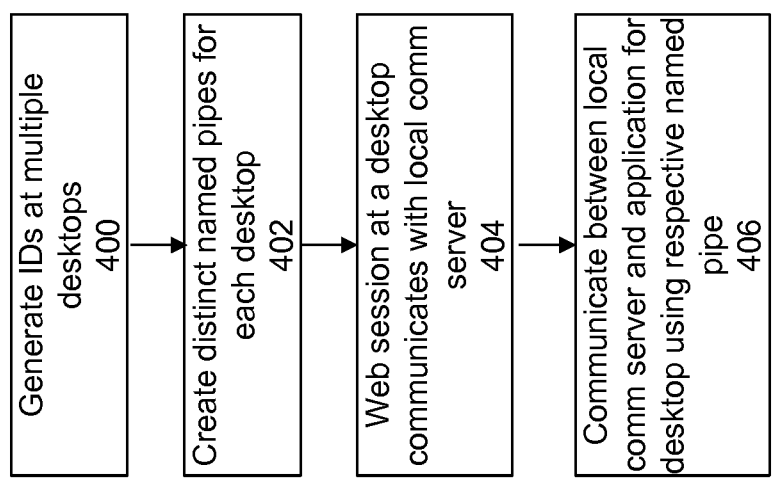
FIG. 4 shows a flowchart of an approach to implement a communications channel to communicate between a local application and a web application for a multi-user scenario.

FIG. 4 illustrates a flowchart of an approach to implement this process. At 400, unique IDs are generated for each of the multiple desktops. At 402, a different named pipe is opened for each of the desktops, applications, and/or web sessions. At 404, the web session communicates with the local comm server, e.g., by sending a CORS request to the local comm server.

At 406, each of the local applications for a respective desktop will communicate to the local comm server using its own named pipe. This means that each of the web apps will communicate messages to the local comm server, which then passes the messages over its own named pipe to the local application.

With this approach, the web app session viewed by a first user will be able to send a message exclusively to the application running on the first user's desktop instance. Similarly, the web app session viewed by a second user will be able to send a message exclusively to the application running on that second user's desktop instance. The local client for each desktop will then be able to send a response to the appropriate web app session for a given message received. This solution is applicable to all supported browsers on the desktop, and is generalizable to be usable with any application.

The messaging with this approach occurs in both directions with low-latency (e.g., UI response times), since the processing occurs locally rather than requiring a check with a remote server.

Security

One potential security concern with this approach is the possibility of a "man in the middle" attack. With these types of attacks, a malicious host may seek to logically impersonate the local comm server, thereby intercepting the communications between the web session and the local comm server. This is because the CORS request is made with an address (e.g., a HTTP address) that is supposed to resolve to the local comm server. However, if the DNS server has been compromised, then the CORS request may end up being resolved to the server maintained by a malicious host.

Figure 5:
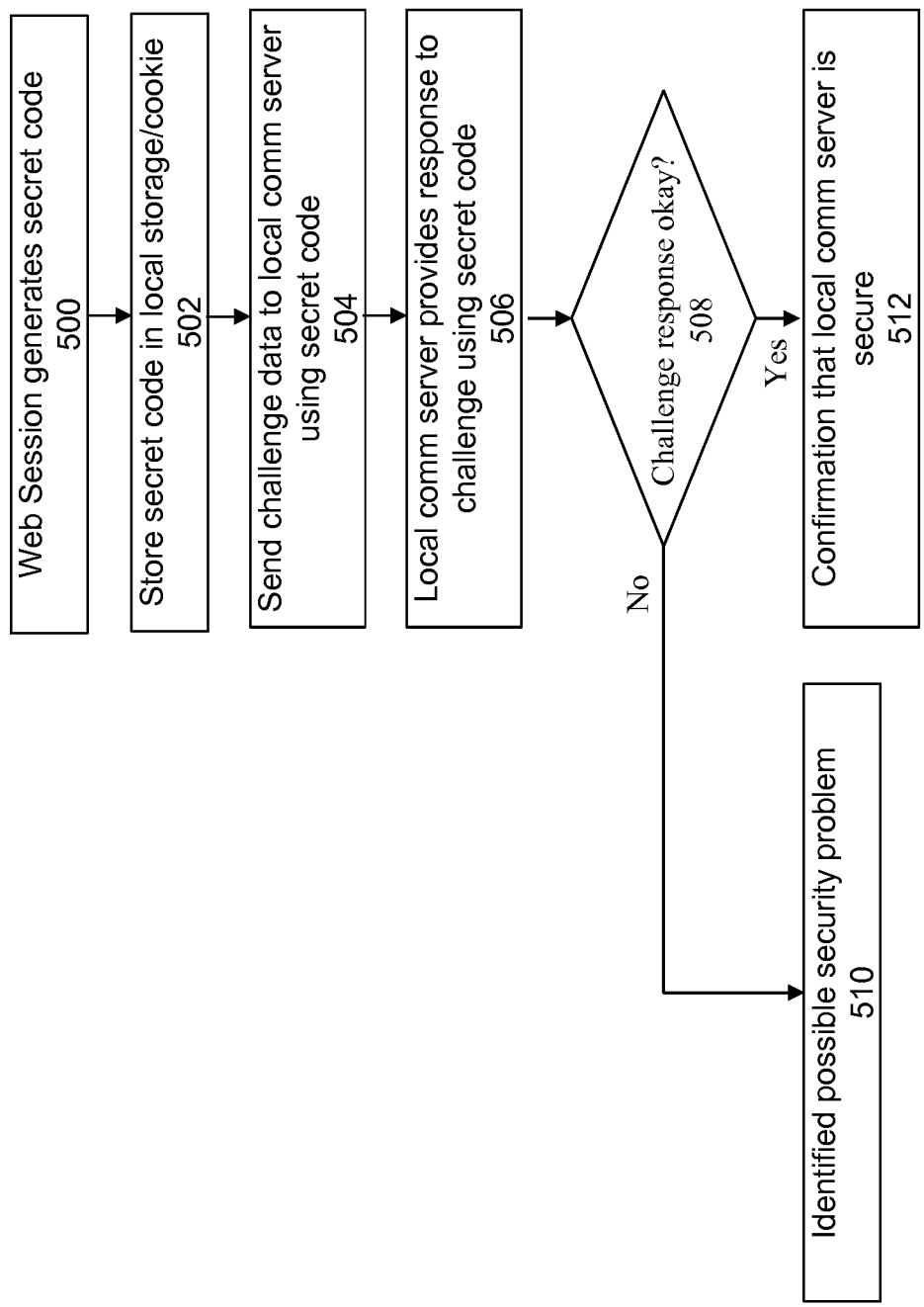
FIG. 5 shows a flowchart of an approach to implement security for a communications channel.

FIG. 5 illustrates a flow chart of an approach to securely implement the present invention. This approach can be used to make sure the CORS requests are made in a secure way to the local comm server.

At 500, the web session generates and/or otherwise acquires secret data (e.g., code, key, text, number, etc.). The secret data is then stored, at 502, at the local device. The data may be stored, for example, in a local storage device and/or cookie. Since the local application is on the same device, this means that the local application and local comm server will also have access to the secret data.

When the web browser makes a CORS request, then at 504, the web browser will also make a challenge to the make sure that it is talking to the correct comm server. For example, the challenge may be composed of a set of random data (e.g., a string that is not secret) that is sent as part of the CORS request to the comm server.

At 506, the comm server will provide a challenge response back to the web browser using the secret data. For example, the comm server will take the random string, hash it with the secret data, and then send it back to the web browser.

At 508, a determination is made whether the challenge response is acceptable. This is performed, for example, by having the web browser also hashing the string with the secret data to see if it matches the challenge response.

If the challenge response is correct, then at 512, confirmation has been made that the comm server is secure. If, however, the challenge response is incorrect, then at 510, a possible security problem has been identified.

It is noted that other approaches can also be taken to verify the security of the system. For example, in some embodiments, the connection to the local comm server from the web app can generally be secured via HTTPS. A DNS entry will be created which points to a specific address. This will allow a certificate to be issued which will allow a secure connection with the local webserver without requiring the user to approve trust of a self-signed certificate at install time. In addition, the above-described challenge may be initiated from either, or both, directions between the local comm server and the web app.

ID Expiration

As noted above, the unique IDs can be created with expiration dates set for a time period in the future (e.g., one year).

Figure 6:
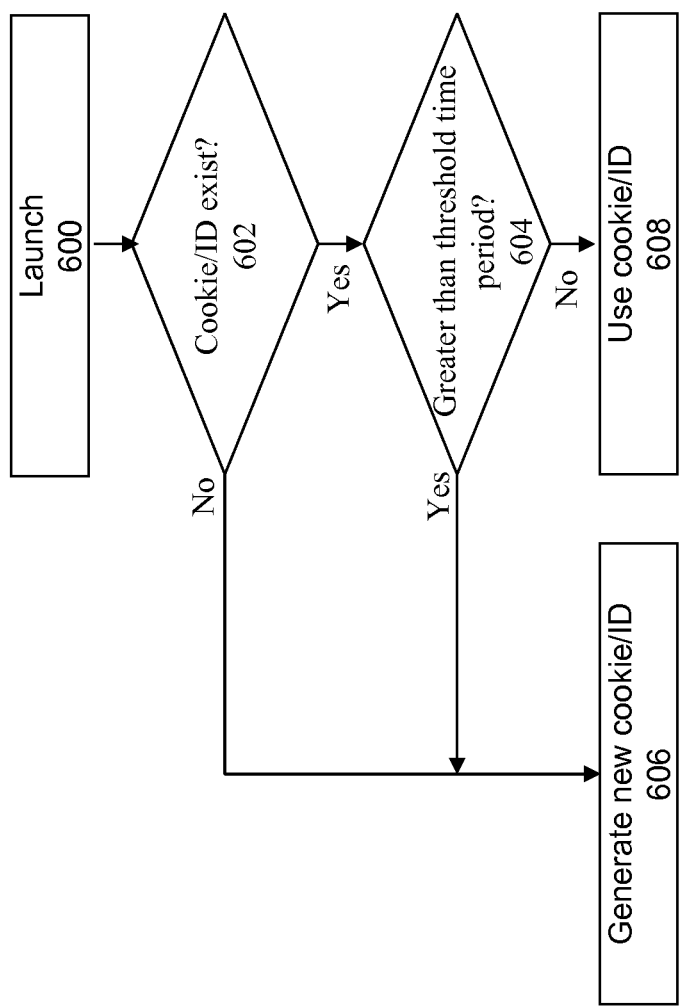
FIG. 6 shows a flowchart of an approach to implement expirations for a communications channel.

FIG. 6 shows a flowchart of an approach to implement this aspect of the current embodiment. At 600, the web application is launched. A determination is made at 602 whether the cookie/ID already exists. If not, then at 606, a new cookie/ID is generated for opening a named pipe.

If the cookie/ID already exists, then another determination is made at 604 whether the existence of the cookie/ID has exceeded the threshold time period (e.g., one year). If so, then the cookie/ID has expired, and the process proceeds to 606 to generate a new cookie/ID. If the existence of the cookie/ID has not exceeded the threshold time period, then at 608, the same cookie/ID can be used to open the named pipe.

In some embodiments, the expiration date can be updated each time the cookie is accessed by the web app. In this way, the cookies are essentially perpetual, and the unique ID for the browser session only needs to be regenerated if the user does not need the access for more than one year.

Editing Application

The present invention can be used to implement communications between a web application and any type of local application. One possible example of a local application that can be implemented with the present invention is an editing application that operates in conjunction with a cloud-based storage system.

Figure 7:
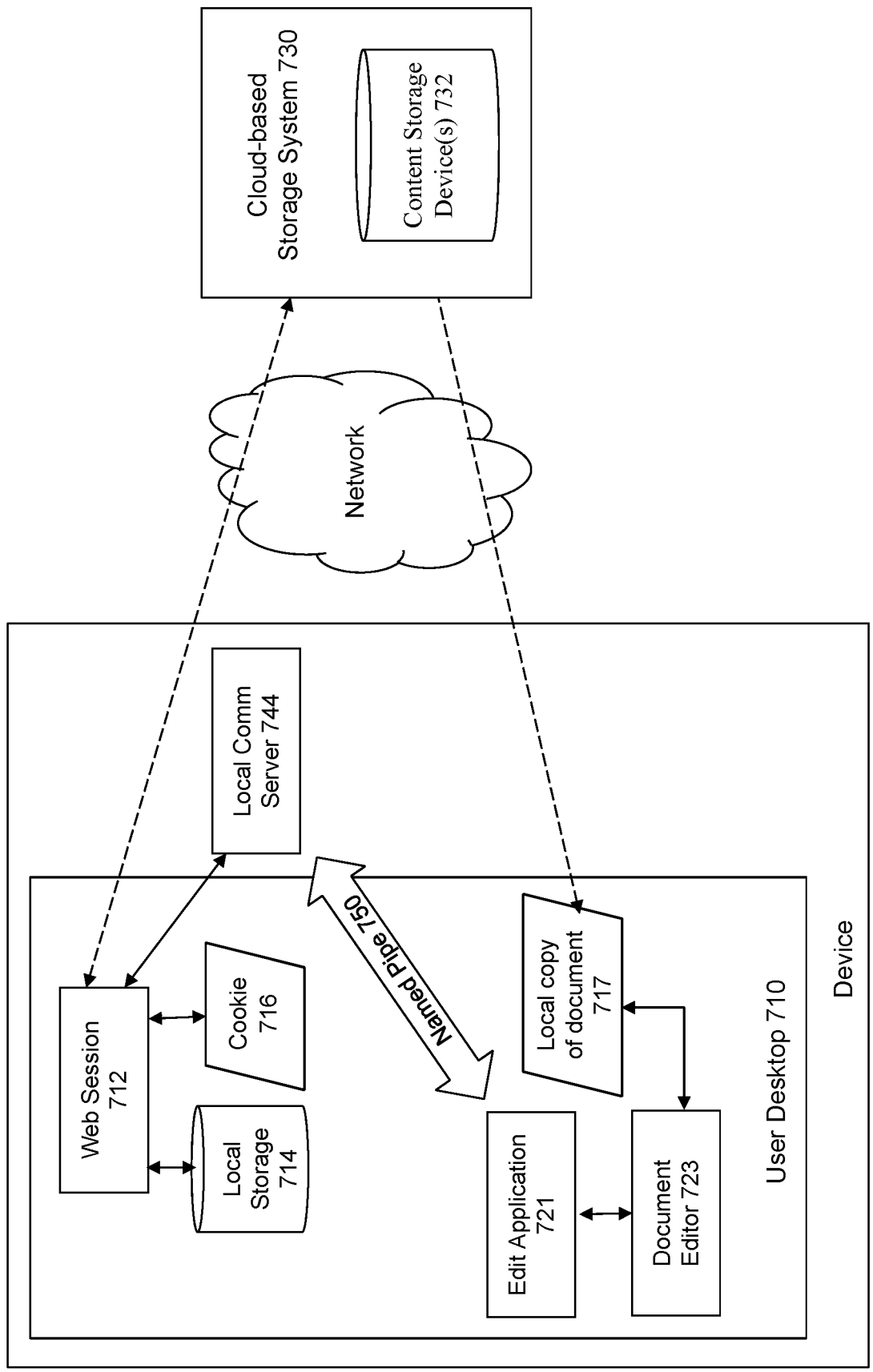
FIG. 7 illustrates an edit application scenario for the communications channel.

As illustrated in FIG. 7, in cloud-based storage system, user files are stored in content storage devices 732 at a remote, cloud-based server 730. A user device 702 includes a web browser 712 at the user desktop 710 that provides a user interface to view a list of files accessible by the user. If the user chooses to edit one of those files, a local edit application 721 can be used to interface between the cloud storage system 730 and a local document editor 723 to edit a local copy 717 of the file.

With some embodiments of the current invention, this process is implemented by having the local comm server 744 use a named pipe 750 to forward communications between the web browser 712 and the edit application 721. Web browser 712 is operatively communicable with its local storage 714 and cookie 716.

Figure 8:
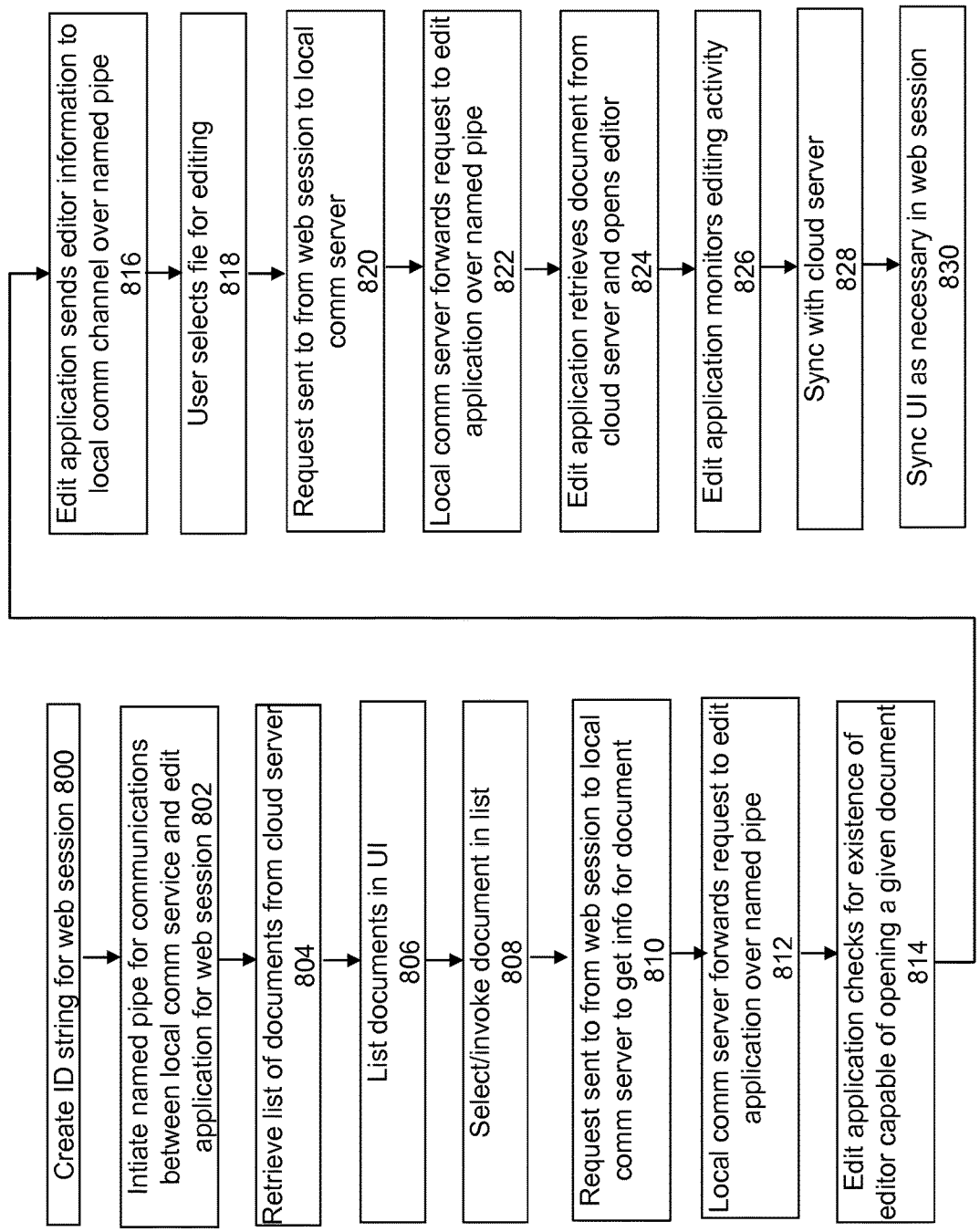
FIG. 8 shows a flowchart of an approach to implement an edit application scenario for the communications channel.

FIG. 8 shows a flowchart of an approach to implement this process. At 800 an ID string is created for the web session. Using the ID string, at 802, a named pipe is opened for communications between the local comm server and the local edit application.

At 804, the web session retrieves a list of files/directories from the cloud storage system that are accessible by the user. Within the web browser, at 806, a UI is presented that lists the accessible files/directories.

The user may manipulate a pointing object to select/invoke one or more items listed in the UI. For example, at 808, the user may seek to "right click" upon a selected file to determine interface options for that file.

One possible reason is to determine whether the file is editable by the system, e.g., whether the system includes an editor that is capable of editing that file. This determination can be made by having the local edit application performs steps to make this check. In some embodiments, this determination may be cached so that it does not need to be performed each and every time, e.g., where information is cached for a given browser session.

At 810, a request (e.g., CORS request) is sent to the local comm server to be passed to the local edit application with an identification of the file type (e.g., identifying the file as a ".doc" file). The request is, at 812, then forwarded by the local comm server to the local edit application over the named pipe.

At 814, the local edit application checks the system to determine which application, if any, is registered to open that file type. For example, the appropriate registry keys can be checked for the file extension type that is associated with the file type identified in the request. At 816, that information is returned over the named pipe to the local comm server. The local comm server then forwards that information to the web session to be displayed in the web browser UI.

At 818, the user may then select the file for editing. A request to edit the file is then sent, at 820, from the web session to the local comm server. The request may include, for example: (a) the ID string; (b) the file ID; and (c) an authorization token. The local comm server will, at 822, open the named pipe and forward the request to the local edit application. The forwarded request includes the file ID and the authorization token.

At 824, the edit application contacts the remote cloud storage system to retrieve the file. The authorization token is used to make sure the user is entitled to access the file. A local copy of the file is placed on the local system. The appropriate editor application is then initiated to open the file for editing, e.g., by logically double-clicking on the locally stored copy of the file.

At 826, the edit application keeps track of the local copy of the application, e.g., in order to monitor editing activity on the file. This is to maintain knowledge of any edits that the user makes and/or saves to the file.

At 828, to any extent necessary, the edit application will synchronize with the cloud server to make sure any necessary updated versions of the file are preserved at the cloud-based system. For example, when the user saves changes to the file, a new version of that file may be created/saved at the cloud-based system. In addition, at 830, the local UI in the web browser may be updated as necessary based upon the user edits. These updates would be implemented by sending communications from the edit application though the named pipe to the web session.

Posture Check Application

Another possible use of the invention is to implement a local posture check application at a local device 902. The idea behind posture check applications is to make sure that access to a remote server from a local device 902 meets certain threshold requirements for that device. This is useful, for example, to allow corporation to enforce policies against access to confidential/corporate information from computers that do not meet minimum levels of security or corporate control.

Figure 9:
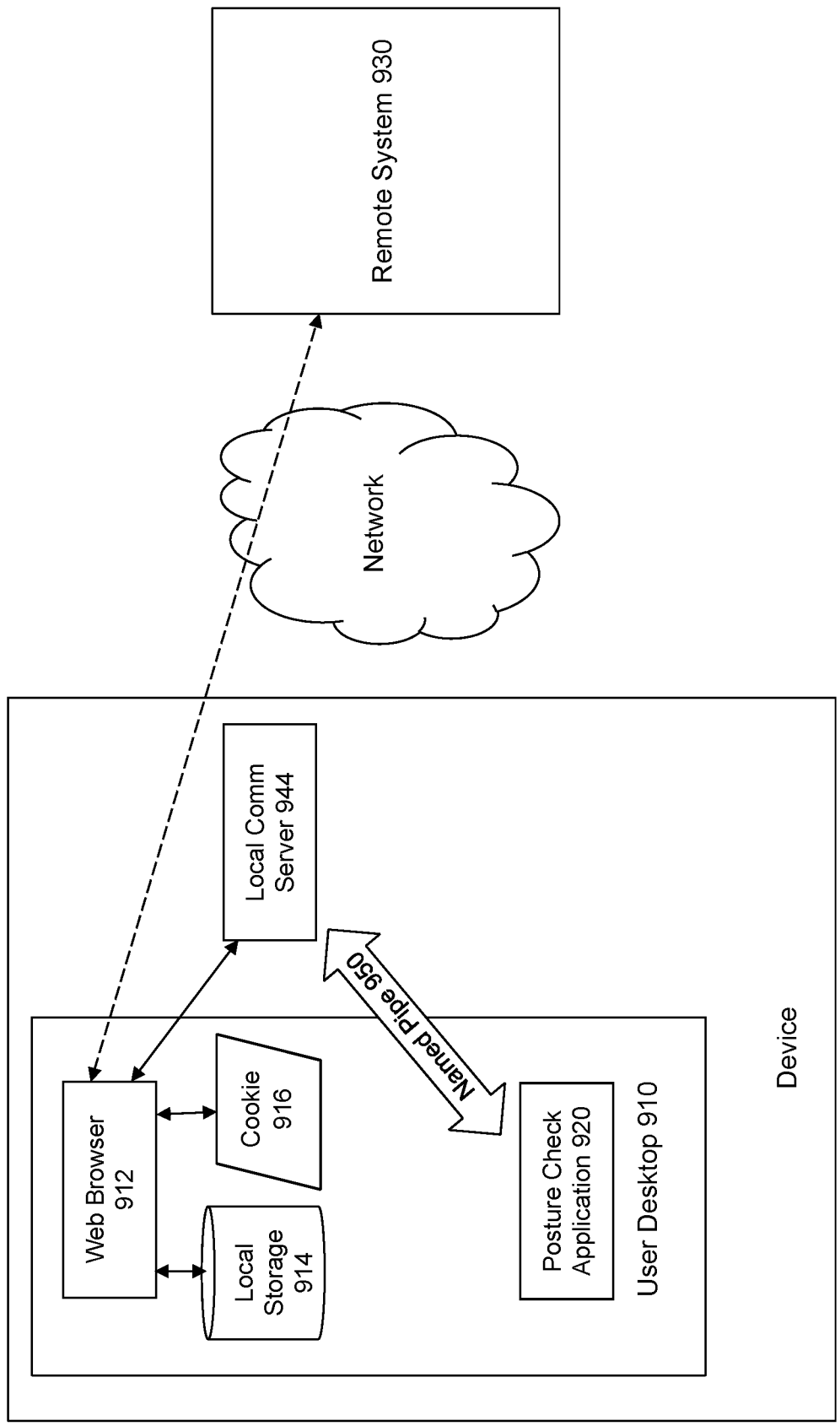
FIG. 9 illustrates a posture check application scenario for the communications channel.

As illustrated in FIG. 9, the invention can be used to implement posture checks by operating a local posture check application 920 on the user desktop 910. When the web session 912 seeks to perform some type of access to a remote system 930, a request is sent to the local comm server 944 to be forwarded over the named pipe 950 to the posture check application 920. Web browser 912 is operatively communicable with its local storage 914 and cookie 916.

Figure 10:
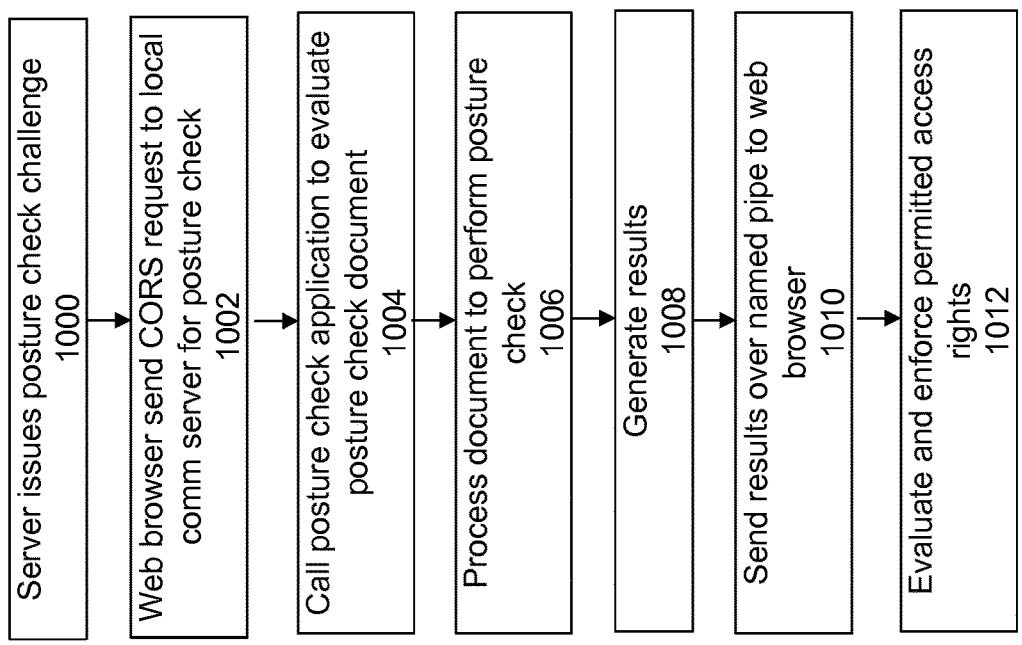
FIG. 10 shows a flowchart of an approach to implement a posture check application scenario for the communications channel.

FIG. 10 shows a flowchart of an approach to implement this process. At 1000, the server issues a posture check challenge when the web session seeks access to the server. At 1002, the web session sends a CORS request to the local comm server for the posture check. The request may include, for example, a document (e.g., a JSON document) having a set of criteria to be evaluated for the posture check. This includes for example, any combination of a check for: (a) whether the system implements the correct type of encryption; (b) whether the computer is managed and/or owned by the corporation; (c) is an anti-virus installed; (d) whether there is a firewall on the system; and/or whether the system has a minimal OS version. Essentially, any check required by the administrator would be implemented within the JSON document.

At 1004, the comm server sends the request to the posture check application to invoke the posture check process. At 1006, the posture check application processes the JSON document to perform the posture check. The document is parsed, and the application starts working through the posture check logic expressed in the document. For example, the system capabilities are checked to determine whether the system includes the minimum security requirements expressed in the document. The posture check results are then produced at 1008.

At 1010, the posture check results are sent over the named pipe to the local comm server, where they are then forwarded to the web session. At 1012, evaluation and enforcement is performed of any permitted access rights. In some embodiments, the server is the entity that enforces the access/denial decisions. For example, failure of the posture check may result in denial of access to the server. In contrast, the acceptable evaluation of the posture check may result in permitted access to the server. A spectrum of access rights may exist, where results of the posture check may be used to define the act location on the spectrum for which access is permitted.

Multiple Applications

Multiple local applications may be run at the local system that need to communicate with a web session. In this situation, each of the applications may be configured to communicate over its own named pipe.

Figure 11:
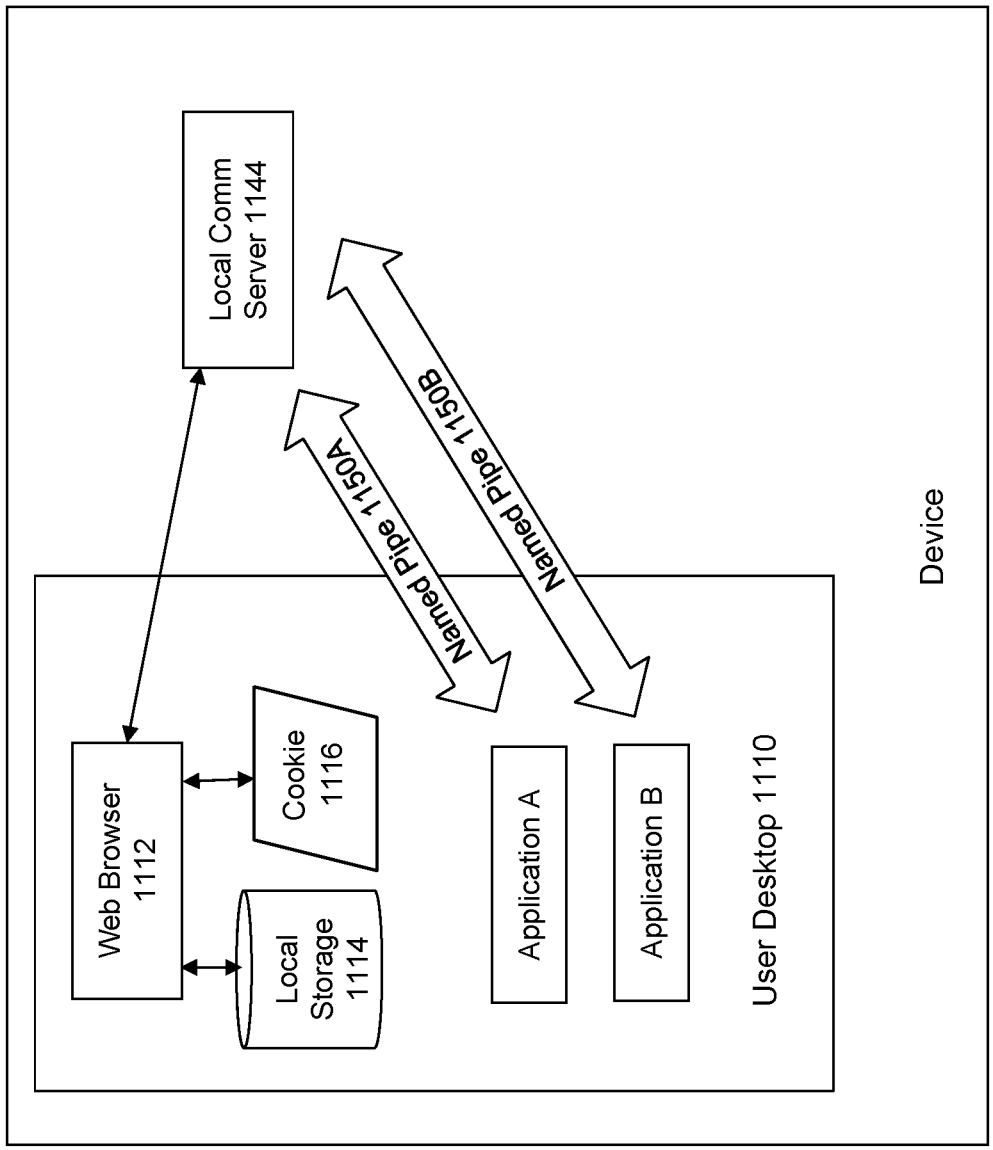
FIG. 11 illustrates multiple local application.

FIG. 11 illustrates this aspect of the current embodiment. Here, a first application A and a second application B are both located on the user desktop 1110 on a device 1102. For example, application A may be a local edit application and application B may be a local posture check application.

Both of these applications A and B need to communicate with the web browser 1112 through the local comm server 1144. As illustrated in this figure, the application A communicates with the local comm server 1144 over named pipe 1150A. In contrast, application B communicates with the local comm server 1144 over a different named pipe 1150B. Web browser 1112 is operatively communicable with its local storage 1114 and cookie 1116.

In this way, the local comm server can safely and distinguishably communicate with each of the local applications.

Example Computing System

Figure 12A:
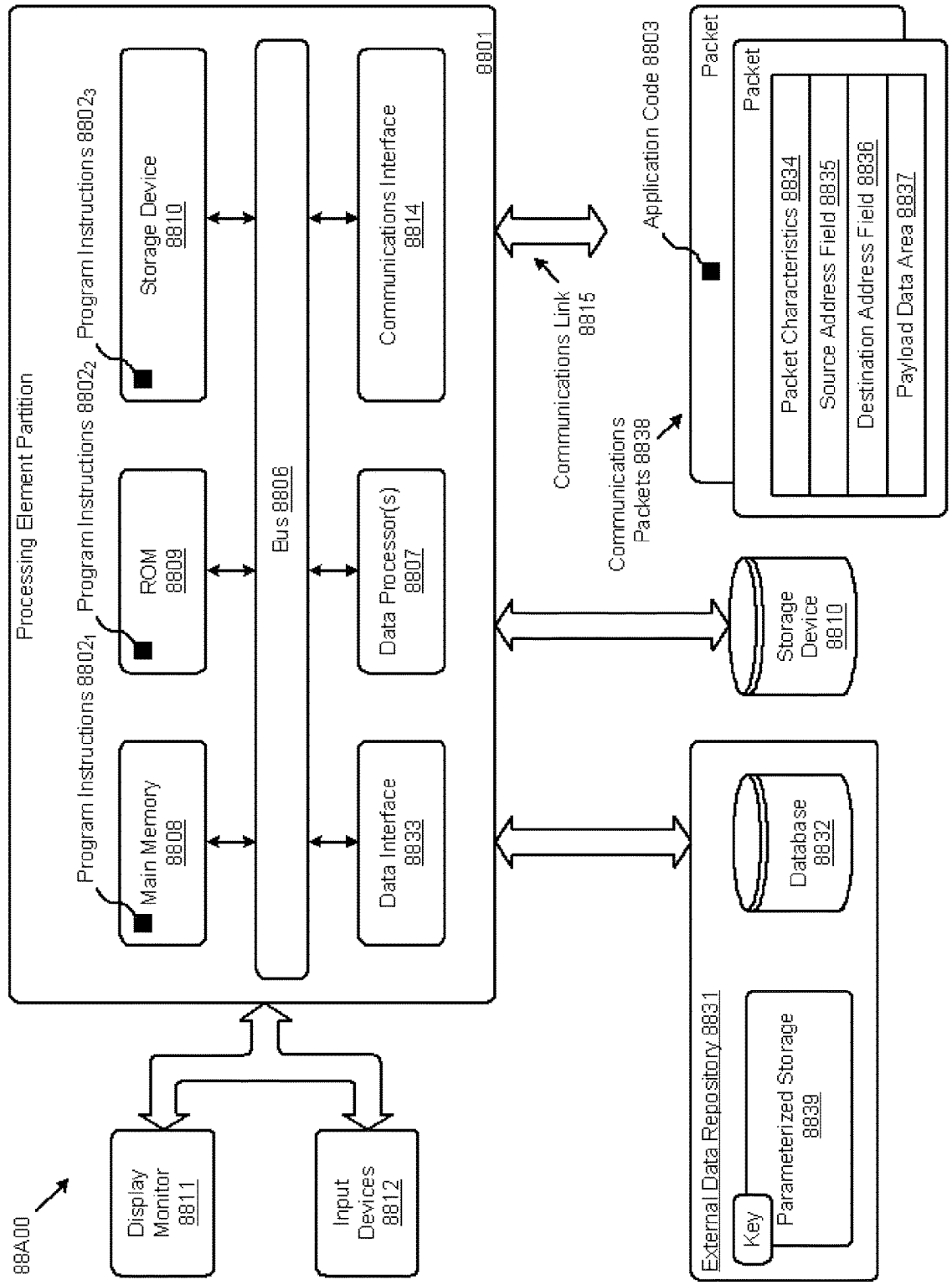
FIGS. 12A and 12B depicts a block diagram of computer system(s) suitable for implementing embodiments of the present disclosure.

FIG. 12A depicts a block diagram of an instance of a computer system 88A00 suitable for implementing embodiments of the present disclosure. Computer system 88A00 includes a bus 8806 or other communication mechanism for communicating information. The bus interconnects subsystems and devices such as a central processing unit (CPU), or a multi-core CPU (e.g., data processor 8807), a system memory (e.g., main memory 8808, or an area of random access memory (RAM)), a non-volatile storage device or non-volatile storage area (e.g., read-only memory 8809), an internal or external storage device 8810 (e.g., magnetic or optical), a data interface 8833, a communications interface 8814 (e.g., PHY, MAC, Ethernet interface, modem, etc.). The aforementioned components are shown within processing element partition 8801, however other partitions are possible. The shown computer system 88A00 further comprises a display 8811 (e.g., CRT or LCD), various input devices 8812 (e.g., keyboard, cursor control), and an external data repository 8831.

According to an embodiment of the disclosure, computer system 88A00 performs specific operations by data processor 8807 executing one or more sequences of one or more program code instructions contained in a memory. Such instructions (e.g., program instructions $8802_1$, program instructions $8802_2$, program instructions $8802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 88A00 performs specific networking operations using one or more instances of communications interface 8814. Instances of the communications interface 8814 may comprise one or more networking ports that are configurable (e.g., pertaining to speed, protocol, physical layer characteristics, media access characteristics, etc.) and any particular instance of the communications interface 8814 or port thereto can be configured differently from any other particular instance. Portions of a communication protocol can be carried out in whole or in part by any instance of the communications interface 8814, and data (e.g., packets, data structures, bit fields, etc.) can be positioned in storage locations within communications interface 8814, or within system memory, and such data can be accessed (e.g., using random access addressing, or using direct memory access DMA, etc.) by devices such as data processor 8807.

The communications link 8815 can be configured to transmit (e.g., send, receive, signal, etc.) any types of communications packets 8838 comprising any organization of data items. The data items can comprise a payload data area 8837, a destination address 8836 (e.g., a destination IP address), a source address 8835 (e.g., a source IP address), and can include various encodings or formatting of bit fields to populate the shown packet characteristics 8834. In some cases the packet characteristics include a version identifier, a packet or payload length, a traffic class, a flow label, etc. In some cases the payload data area 8837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 8807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 8831, which in turn can be formatted into any one or more storage areas, and which can comprise parameterized storage 8839 accessible by a key (e.g., filename, table name, block address, offset address, etc.).

Execution of the sequences of instructions to practice certain embodiments of the disclosure is performed by a single instance of the computer system 88A00. According to certain embodiments of the disclosure, two or more instances of computer system 88A00 coupled by a communications link 8815 (e.g., LAN, PTSN, or wireless network) may perform the sequence of instructions required to practice embodiments of the disclosure using two or more instances of components of computer system 88A00.

The computer system 88A00 may transmit and receive messages such as data and/or instructions organized into a data structure (e.g., communications packets 8838). The data structure can include program instructions (e.g., application code 8803), communicated through communications link 8815 and communications interface 8814. Received program code may be executed by data processor 8807 as it is received and/or stored in the shown storage device or in or upon any other non-volatile storage for later execution. Computer system 88A00 may communicate through a data interface 8833 to a database 8832 on an external data repository 8831. Data items in a database can be accessed using a primary key (e.g., a relational database primary key).

The processing element partition 8801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 8807. Some embodiments include one or more special-purpose hardware components (e.g., power control, logic, sensors, transducers, etc.). A module may include one or more state machines and/or combinational logic used to implement or facilitate performance characteristics.

Various implementations of the database 8832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of the present disclosure). Such files or records can be brought into and/or stored in volatile or non-volatile memory.

Figure 12B:
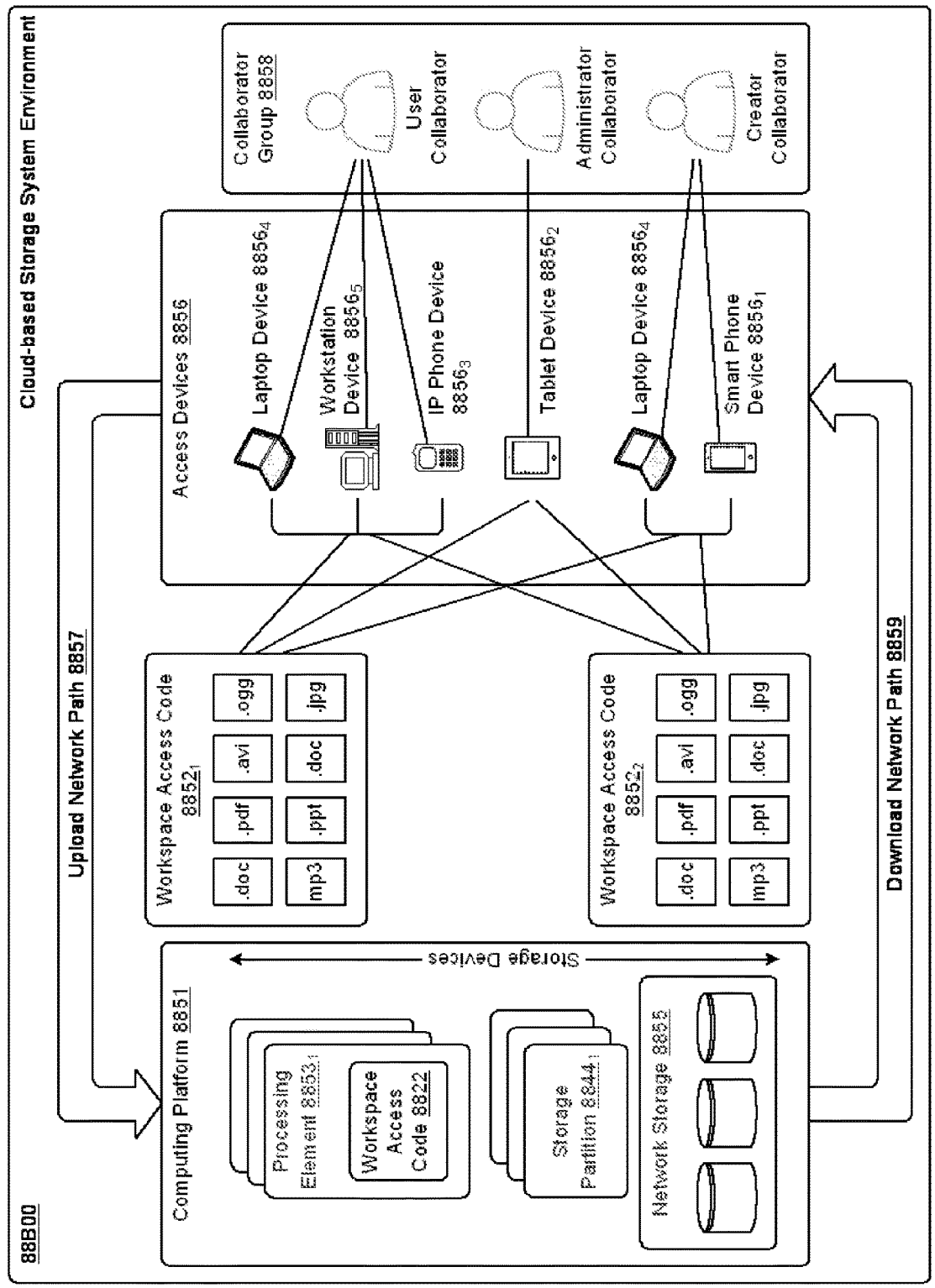

FIG. 12B depicts a block diagram of an instance of a cloud-based environment 88B00. Such a cloud-based environment supports access to workspaces through the execution of workspace view code (e.g., workspace access code $8852_1$ and workspace access code $8852_2$. Workspace access code can be executed on any of the shown access devices (e.g., laptop device $8852_4$, workstation device $8852_5$, IP phone device $8852_3$, tablet device $8852_2$, smart phone device $8852_1$, etc.). A group of users can form a collaborator group 8858, and a collaborator group can be comprised of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform, including in a middleware setting. As shown, a portion of the workspace access code resides in and can be executed on one or more processing elements (e.g., processing element $8852_3$). The workspace access code can interface with storage devices such the shown networked storage 8855. Storage of workspaces and/or any constituent files or objects, and/or any other code or scripts or data can be stored in any one or more storage partitions (e.g., storage partition 88540. In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 8857). A stored workspace can be delivered to a particular user and/or shared with other particular users via a download (e.g., a download from a processing element to an access device over a download network path 8859).

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method comprising:
   identifying a computing device comprising a web application session, a local communications server, and a local application; and
   communicating between the web application session and the local application via the local communications server, wherein communications between the web application session and the local application via the local communications server is implemented by:
       generating an identifier for the web application session, the web application session corresponding to a web application executed with a web browser,
       communicating a request between the web application session and the local communications server, and
       opening an IPC (inter-process communications) channel between the local communications server and the local application using at least the identifier, wherein communicating between the local communications server and the local application is performed over the IPC channel.

2. The method of claim 1, wherein a second IPC channel is used to communicate between the local communications server and a second local application.

3. The method of claim 2, wherein the second local application is on a different desktop from the local application.

4. The method of claim 1, wherein the identifier is stored in at least one of a cookie or a local storage medium.

5. The method of claim 1, wherein the local application comprises an edit application, and the edit application calls a document editor application to open a locally stored copy of a file from a remote cloud server.

6. The method of claim 1, wherein the IPC channel comprises a named pipe.

7. The method of claim 1, wherein the local application comprises a posture check application that performs a posture check of a local system.

8. The method of claim 7, wherein the request comprises a document having a set of criteria to be evaluated for the posture check, including at least one of the following: (a) whether a correct type of encryption is implemented; (b) whether a calling system is managed and/or owned by a designated entity; (c) whether an anti-virus program installed; (d) whether a firewall is installed; or (e) whether a minimal OS version is installed.

9. The method of claim 1, wherein the identifier corresponds to an expiration period.

10. The method of claim 1, wherein the request comprises a Cross Origin Resource Sharing (CORS) request.

11. A computer program product, embodied in a non-transitory computer readable medium, the non-transitory computer readable medium having stored thereon a sequence of instructions which, when executed by a processor causes the processor to execute a process, the process comprising:
    identifying a computing device comprising a web application session, a local communications server, and a local application; and
    communicating between the web application session and the local application via the local communication server, wherein a communication channel is configured between the web application session and the local application by:
        generating an identifier for the web application session, the web application session corresponding to a web application executed with a web browser,
        communicating a request between the web application session and the local communications server, and
        opening an IPC (inter-process communications) channel between the local communications server and the local application using at least the identifier, wherein communicating between the local communications server and the local application is performed over the IPC channel.

12. The computer program product of claim 11, wherein a second IPC channel is used to communicate between the local communications server and a second local application.

13. The computer program product of claim 11, wherein a second local application is on a different desktop from the local application.

14. The computer program product of claim 13, wherein the identifier is stored in at least one of a cookie or a local storage medium.

15. The computer program product of claim 11, wherein the local application comprises an edit application, and the edit application calls a document editor application to open a locally stored copy of a file from a remote cloud server.

16. The computer program product of claim 11, wherein the local application comprises a posture check application that performs a posture check of a local system.

17. The computer program product of claim 16, wherein the request comprises a document having a set of criteria to be evaluated for the posture check, including at least one of the following: (a) whether a correct type of encryption is implemented; (b) whether a calling system is managed and/or owned by a designated entity; (c) whether an anti-virus program installed; (d) whether a firewall is installed; or (e) whether a minimal OS version is installed.

18. The computer program product of claim 11, wherein the IPC channel comprises a named pipe.

19. The computer program product of claim 11, wherein the request comprises a Cross Origin Resource Sharing (CORS) request.

20. The computer program product of claim 11, wherein the identifier corresponds to an expiration period.

21. A system comprising:
a processor; and
a memory comprising a computer program product, embodied in a non-transitory computer readable medium, the non-transitory computer readable medium having stored thereon a sequence of instructions which, when executed by the processor causes the processor to execute a process, the process comprising:
identifying a computing device comprising a web application session, a local communications server, and a local application; and
communicating between the web application session and the local application via the local communication server, wherein a communication channel is configured between the web application session and the local application by:
generating an identifier for the web application session, the web application session corresponding to a web application executed with a web browser,
communicating a request between the web application session and the local communications server, and
opening an IPC (inter-process communications) channel between the local communications server and the local application using at least the identifier, wherein communicating between the local communications server and the local application is performed over the IPC channel.

22. The system of claim 21, wherein a second IPC channel is used to communicate between the local communications server and a second local application.

23. The system of claim 22, wherein the second local application is on a different desktop from the local application.

24. The system of claim 21, wherein the identifier is stored in at least one of a cookie or a local storage medium.

25. The system of claim 21, wherein the local application comprises an edit application, and the edit application calls a document editor application to open a locally stored copy of a file from a remote cloud server.

26. The system of claim 21, wherein the local application comprises a posture check application that performs a posture check of a local system.

27. The system of claim 26, wherein the request comprises a document having a set of criteria to be evaluated for the posture check, including at least one of the following: (a) whether a correct type of encryption is implemented; (b) whether a calling system is managed and/or owned by a designated entity; (c) whether an anti-virus program installed; (d) whether a firewall is installed; or (e) whether a minimal OS version is installed.

28. The system of claim 21, wherein the IPC channel comprises a named pipe.

29. The system of claim 21, wherein the request comprises a Cross Origin Resource Sharing (CORS) request.

30. The system of claim 21, wherein the identifier corresponds to an expiration period.

\* \* \* \* \*